Feb. 19, 1929.
P. BÖTTCHER
1,702,860
DOUBLE HELICAL OR DOUBLE SPIRAL GEAR
Filed July 31, 1925
2 Sheets-Sheet 1

Inventor
By P. Böttcher
Marks & Clerk
attys

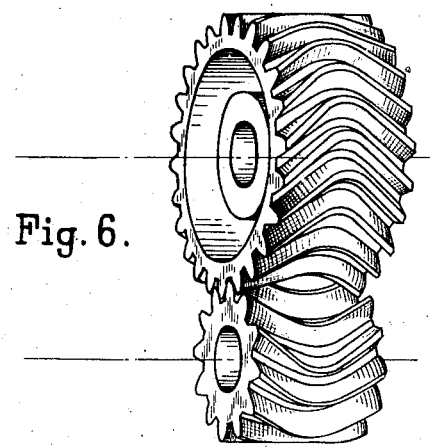
Fig. 6.
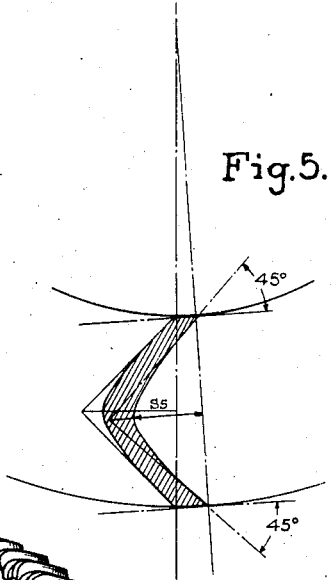
Fig. 5.
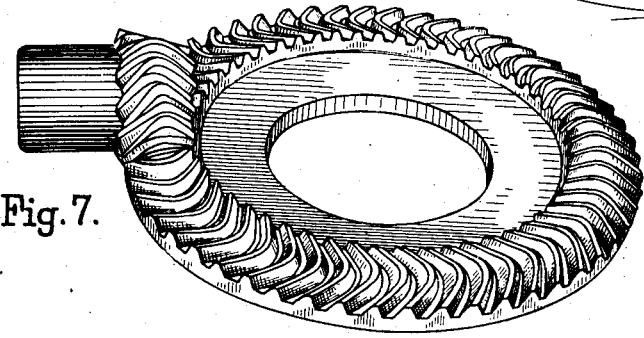
Fig. 7.
Fig. 8.
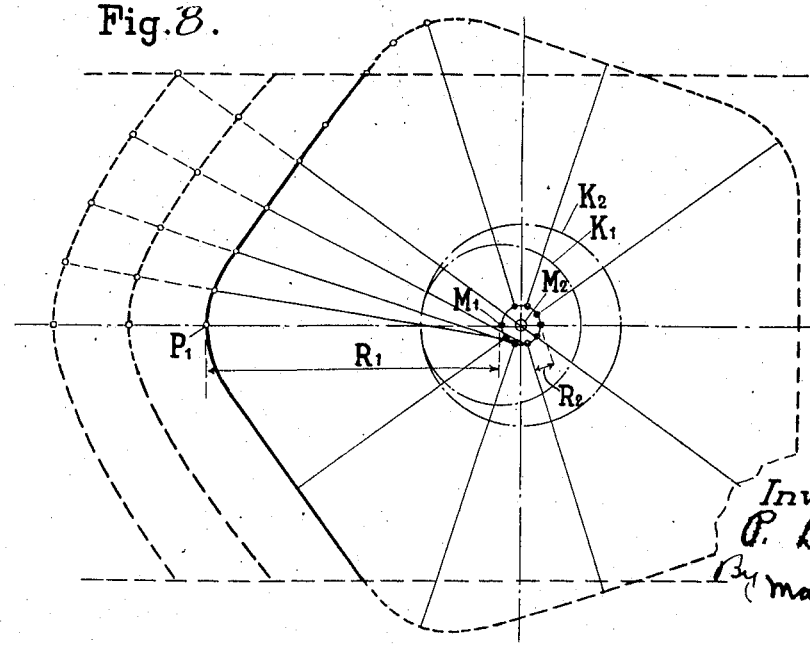

Patented Feb. 19, 1929.

1,702,860

UNITED STATES PATENT OFFICE.

PAUL BÖTTCHER, OF ALTONA-BAHRENFELD, NEAR HAMBURG, GERMANY.

DOUBLE HELICAL OR DOUBLE SPIRAL GEAR.

Application filed July 31, 1925, Serial No. 47,355, and in Germany September 12, 1924.

This invention relates to double helical or double spiral gears, sometimes referred to as herringbone gears, including cylindrical and bevel pinions and wheels, the object being to produce teeth for such gears having a new and efficient configuration, and also to facilitate the manufacture thereof.

The high efficiency and practical advantages of herringbone gears are well known in the art both as regards cylindrical and bevel gears, including wheels and pinions. It is obvious that maximum efficiency can only be obtained if the two inclined branches of each tooth merge into each other, that is to say, they are continuous. In the theoretically true herringbone tooth a sharp corner occurs at the junction of the two branches of the tooth but this presents difficulties in practice and frequently the corner is rounded off by a subsequent or secondary operation.

When herringbone gears are cut from blanks according to the profiled end mill system the teeth so formed have the defect that the two branches of each tooth do not intersect sharply as the radius of the end mill results in a corresponding rounding on the concave side at the junction and, in order to ensure accurate meshing of this rounded portion with the corresponding point or apex of the teeth of a fellow wheel, it is necessary in a subsequent operation to round the apex or convex side of the junction to correspond.

As a profiled end mill does not produce a correct profile for this rounded portion at the junction this part cannot participate in the transmission of power, so that the effective width of the tooth is diminished.

A herringbone tooth formed by an end mill, therefore, comprises two inclined branches united by a small circular arcuate portion, corresponding to the radius of the end mill, so that the herringbone formation is to some extent curved, but it does not have a bearing surface at the curved portion. In order to avoid the above defects it has been proposed to substitute circular arcuate teeth for the herringbone teeth. If a tooth of this form be arranged symmetrically in relation to the median plane of the wheel it is not built up as it were from two difficultly united branches and can be machine cut in a continuous operation. Such teeth therefore present no serious difficulties in machining according to the modern generating methods, and moreover each tooth presents a bearing surface throughout the entire width of the wheel, avoiding any inconvenient corners. Such teeth, like the herringbone teeth, also ensure gradual transmission of power without setting up axial pressure.

In comparison with the herringbone teeth, other conditions being equal, the circular arcuate teeth have the disadvantage of a much reduced overlap owing to their very slight inclination to the median plane of the wheel, what inclination there is increasing gradually towards the edges of the wheel rim and resulting in a comparatively small overlap for the entire tooth. Such wheels therefore are usually made broader than herringbone toothed wheels for the same conditions.

The object of the present invention therefore is to obtain a configuration of tooth intermediate in some respects of the two configurations above discussed, which will retain advantages of the circular arcuate teeth while substantially eliminating their disadvantages, particularly as regards overlap.

The fundamental principle of a continuous curve is retained, but is modified or adapted, that is the simple circular arc of uniform curvature throughout is replaced by a curve which approaches more nearly to the herringbone configuration, and is therefore much more efficient. For the exact determination of the wheel body, the possibility of machining is of principal importance.

For example: By shaping the tooth according to a hypocycloid it is possible to generate a tooth of a form similar to the parabolic form.

The unitary connection of the parts of the whole tooth on a continuous curve is therefore maintained, while the overlap is considerably increased in comparison with the circular arcuate tooth.

Several embodiments of the invention will now be described by way of example with reference to the accompanying drawings, but it is to be understood that the invention is not restricted to the particular details described and shown by way of illustrating the principles underlying the invention.

In the drawings:—

Figure 1:
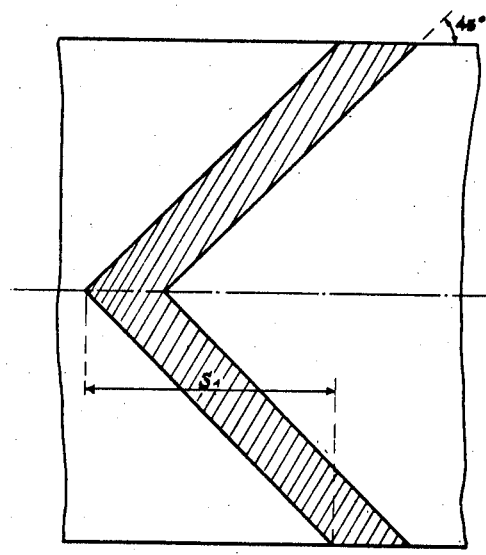
Figures 1, 2 and 3 are developed sections or the usual type of diagram adopted in the art to illustrate gear teeth, the figures respectively indicating a true herringbone tooth, a herringbone tooth formed by an end mill and a circular arcuate tooth.
Figure 2:
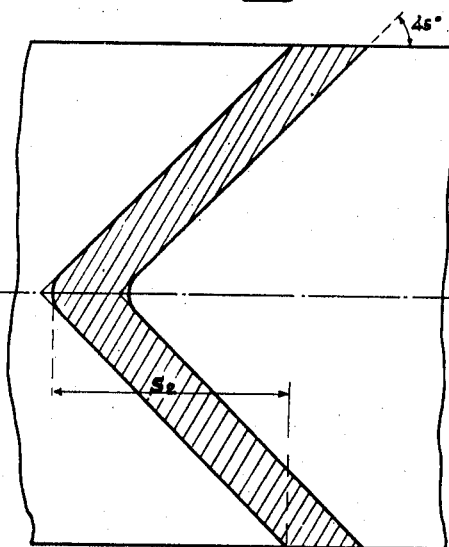
Figure 3:
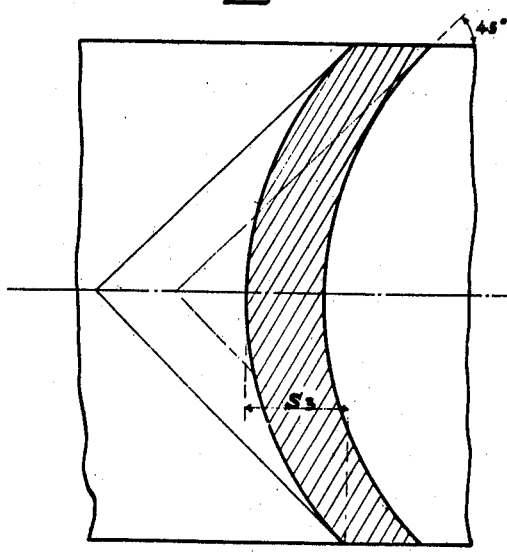
Figure 4:
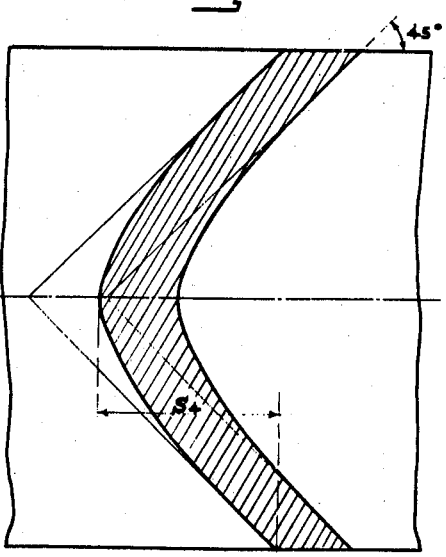
Figure 4 is a similar developed section or diagram of one form of gear tooth according to the invention.

For the sake of comparison the teeth illustrated in the above figures are all of the same pitch and width and of the same spiral angle, namely, 45°.

The developed sectional mode of illustration is adopted as the outlines shown are assumed to be produced by the molding or cutter generating process wherein the cutting edge of the tool is moved in the plane (in which the sections are assumed to be developed) in order to cut or carve out the desired shape of tooth from a blank rotated or rolled in this plane, as will be clear to those skilled in the art of gear cutting, the outlines shown in the figures defining the flanks of the teeth in this plane, representing at the same time the path of the cutting edge when producing the teeth by the generating process.

Figure 5 is a developed section of one form of tooth according to the invention suitable for a bevel wheel.

Figure 6 is a perspective view illustrating two double helical gears according to the invention.

Figure 7 is a perspective view illustrating one form of double helical bevel pinion and bevel wheel according to the invention.

Figure 8 is a diagram showing the development of the curve of the cutting edge of the tool used in making gearing in accordance with my invention.

The majority of generating gear cutting machines now in use for cutting helical or spiral gears comprise a tool carrier which is so arranged as to cause one or more obliquely arranged cutting edges to move along paths corresponding to the required profile of the tooth of an imaginary rack (or in the case of bevel wheels the required profile of a tooth of a crown wheel, namely, one having rectilinear teeth) the helical or spiral paths for the tools being generated by the setting up of a certain relative motion between the blank and cutter, usually by rotating the blank about its axis simultaneously with the movement of the tool carrier. The profile of the teeth produced with machines of this kind is therefore dependent upon the cutting movement of the cutting edge of the tool being generated from the teeth of a rack or of a crown wheel as a basis.

Of all the mechanical movements, the simple circular movement is the simplest and most complete to perform. As the simple circular movement of the cutting edges, according to the rolling-off or development process, generates the teeth or gearing in form of a circular arc, the gear possesses the herringbone form only in incomplete manner. According to this invention, the simple circular arc is replaced by a cyclic curve which is generated by the rolling-off (or development) of two circles within each other. With the help of cyclic curves for the longitudinal curve of the teeth and with the selection of all corresponding conditions, a form can be obtained, which is much nearer to the double helical or herringbone gear form, without losing the advantage of the circular arc of a continuous curve. It is further not very difficult to move a cutting edge along a cyclic curve in similar manner, as the cutting edge in the manufacture of toothed gears having a circular arc form. For this purpose it is only necessary to add to the simple circular movement a second simultaneous rotary movement around a second center point. Therefore, when the tool holder simultaneously with the rotary movement around its own axis performs a second circular movement of its axis around a second correspondingly located center point, a so-called planetary movement of the tool holder results. Due to this planetary cutting movement the movement of the cutting edge does no more take place along a simple circular curve, but along a cyclic curve which results from the two circular movements or the rolling-off of two corresponding circles within each other. An arc-shaped piece of this cyclic curve may then be used instead of a simple circular arc by means of the known "rolling-off movement" between wheel body and tool for the development of tooth-faces which are curved in their development upon a plane according to such cyclic curve, and whose special form is the subject of the present invention.

The generation of such a cyclic curve as it is used as tooth-shaped for double helical gears is shown, as an example in Figure 8. The path described by each cutting edge corresponds to the locus of a point $P_1$ connected to the rolling circle $K_1$ at a distance $R_1$ from the centre of the circle $K_1$. The rolling circle $K_1$ is assumed to roll in the relatively stationary circle $K_2$ without sliding relatively thereto. The centre $M_1$ of the rolling circle $K_1$ will thereby be caused to describe a circle of the radius $R_2$ around the centre $M_2$ of the stationary circle $K_2$. The point $P_1$ will describe a continuous hypotrochoid.

Provided the diameters of the circles $K_1$ and $K_2$ bear the ratio to each other of 4:5, the point $P_1$ will describe a hypotrochoid by the rolling of the circle $K_1$ within the circle $K_2$, which hypotrochoid will possess the shape of a rounded pentagon. The section of this pentagon which is shown in full lines is of the desired substantially parabolic or herringbone shape and in the same manner as a circular arc it may be used directly as the fundamental form developed in a plane, for the novel form of herringbone teeth according to this invention.

The exact shape of the prolonged hypotrochoid produced is determined by a corresponding selection of the proportions of dimensions between the values $R_1$, $K_1$ and $K_2$.

All cylindrical curves which are generated by the rolling-off of two circles within each other, and which have the form of rounded quadrangles can be used as basic form for a plane gearing for double helical gears. All gearings which are developed according to the known rules of the development process (rolling-off process) in spur and conical gears constitute the subject of this invention.

I claim—

1. A herringbone tooth for a cylindrical or bevel gear wheel or the like, generated from a rack or crown wheel as a basis and having flanks shaped longitudinally to a portion of a hypotrochoid.

2. A herringbone tooth for a cylindrical or bevel gear wheel or the like, generated from a rack or crown wheel as a basis and having flanks shaped longitudinally to a portion of a hypotrochoid of substantially rounded-polygon-form.

In testimony whereof I affix my signature.

PAUL BÖTTCHER.